United States Patent
Vácha et al.

(10) Patent No.: US 11,741,731 B2
(45) Date of Patent: *Aug. 29, 2023

(54) AUTOMATED PARASITE ANALYSIS SYSTEM

(71) Applicant: Intervet Inc., Madison, NJ (US)

(72) Inventors: Pavel Vácha, Prague (CZ); Petr Jankuj, Přerov (CZ); Richard Josef Marhoefer, Worms (DE); Václav Belák, Prague (CZ); Jindřich Soukup, Prague (CZ); Brunhilde Schölzke, Mainz (DE); Britta von Oepen, Waldalgesheim (DE)

(73) Assignee: Intervet Inc., Madison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,613

(22) Filed: Jul. 18, 2022

(65) Prior Publication Data

US 2022/0351531 A1 Nov. 3, 2022

Related U.S. Application Data

(63) Continuation of application No. 16/442,310, filed on Jun. 14, 2019, now Pat. No. 11,423,679, which is a
(Continued)

(51) Int. Cl.
*G06V 20/00* (2022.01)
*G06V 20/69* (2022.01)
*G06T 7/00* (2017.01)

(52) U.S. Cl.
CPC .......... *G06V 20/698* (2022.01); *G06V 20/693* (2022.01); *G06V 20/695* (2022.01);
(Continued)

(58) Field of Classification Search
CPC .......... G06K 9/00147; G06K 9/00134; G06K 9/0014; G06T 2207/30004; G06T 7/0012;
(Continued)

(56) References Cited

U.S. PATENT DOCUMENTS 5,189,494 A * 2/1993 Muraki ................ G03F 9/7049
                                                        250/237 G
5,716,889 A * 2/1998 Tsuji ......................... G03F 9/70
                                                        257/797

(Continued)

OTHER PUBLICATIONS

Díaz, G. et al. "A semi-automatic method for quantification and classification of erythrocytes infected with malaria parasites in microscopic images," Journal of Biomedical Informatics, vol. 42, Issue 2, Jan. 4, 2009, pp. 296-307.
(Continued)

*Primary Examiner* — Frank F Huang
(74) *Attorney, Agent, or Firm* — Fenwick & West LLP

(57) ABSTRACT

A parasite analysis system includes a pressure vessel configured to store a biological sample, an imaging cell connected to the pressure vessel, and a waste depository connected to the imaging cell. An input valve controls whether biological sample can flow from the pressure vessel into the imaging cell and an output valve controls whether biological sample can flow from the imaging cell into the waste depository. The parasite analysis system also includes a camera that captures a chronological set of images of a portion of the biological sample in the imaging cell and an image analysis system that analyzes the chronological set of images to generate an estimate of a number of parasites in the portion of the biological sample. Estimates for multiple portions of the biological sample may be generated and sampling techniques used to estimate the number of parasites in the entire biological sample.

20 Claims, 6 Drawing Sheets

Related U.S. Application Data continuation of application No. 16/039,147, filed on Jul. 18, 2018, now Pat. No. 10,372,967.

(52) U.S. Cl.
CPC .. *G06T 7/0012* (2013.01); *G06T 2207/10056* (2013.01); *G06T 2207/30004* (2013.01)

(58) Field of Classification Search
CPC .......... G06T 2207/10056; G06T 7/194; G06T 7/215; G06T 7/77; G06T 2207/20081; G06T 2207/20084; G06T 2207/20076; G06T 2207/10016; G06T 2207/20072; G06T 2207/30028; G06T 2207/30092; G06T 2207/30242
See application file for complete search history.

(56) References Cited

U.S. PATENT DOCUMENTS

| | | | | |
|---|---|---|---|---|
| 8,436,834 | B2* | 5/2013 | Cheng | G02B 6/0001 178/18.09 |
| 8,582,860 | B2* | 11/2013 | Malon | G06T 7/0012 382/133 |
| 8,957,958 | B2* | 2/2015 | Kuppig | G02B 21/367 382/128 |
| 11,473,139 | B2* | 10/2022 | Church | C12Q 1/6869 |
| 2007/0156379 | A1* | 7/2007 | Kulkarni | G06F 30/30 703/14 |
| 2010/0033221 | A1 | 12/2010 | Birdwell et al. | |
| 2010/0332210 | A1* | 12/2010 | Birdwell | G06F 16/2228 703/22 |
| 2011/0216953 | A1* | 9/2011 | Callahan | G06K 9/00 382/128 |
| 2012/0065087 | A1* | 3/2012 | Sharp | C12Q 1/6883 506/9 |
| 2012/0189601 | A1* | 7/2012 | Esko | A61P 3/00 424/94.3 |
| 2014/0293091 | A1* | 10/2014 | Rhoads | G01J 3/513 348/234 |
| 2015/0049919 | A1 | 2/2015 | Humal | |
| 2015/0297620 | A1* | 10/2015 | Boletta | A61K 31/155 514/23 |
| 2016/0187199 | A1* | 6/2016 | Brunk | G06K 9/4661 348/89 |
| 2017/0161545 | A1 | 6/2017 | Champlin et al. | |
| 2018/0008982 | A1* | 1/2018 | Ying | G01N 33/57492 |
| 2018/0012137 | A1* | 1/2018 | Wright | G05B 15/02 |
| 2018/0303466 | A1* | 10/2018 | Kashyap | A61B 10/007 |

OTHER PUBLICATIONS

European Patent Office, Extended European Search Report and Opinion, EP Patent Application No. 18188571.6, dated Feb. 13, 2019, 7 pages.

First Action Interview Office Action for U.S. Appl. No. 16/039,147, dated Dec. 14, 2018, four pages.

Mehanian, C. et al., "Computer-Automated Malaria Diagnosis and Quantitation Using Convolutional Neural Networks," IEEE International Conference on Computer Vision Workshops (ICCV), Oct. 22-29, 2017, pp. 116-125.

Pre-Interview First Office Action for U.S. Appl. No. 16/039,147, dated Sep. 27, 2018, four pages.

Savkare, S. S., et al., "Automatic System for Classification of Erythrocytes Infected with Malaria and Identification of Parasite's Life Stage," 2nd International Conference on Communication, Computing & Security [ICCCS-2012], Procedia Technology, 2012, pp. 405-410, vol. 6.

United States Office Action, U.S. Appl. No. 16/442,310, dated Nov. 5, 2021, 25 pages.

United States Office Action, U.S. Appl. No. 16/442,310, dated Jul. 16, 2021, 26 pages.

\* cited by examiner

AUTOMATED PARASITE ANALYSIS SYSTEM

CROSS REFERENCE TO RELATED APPLICATIONS

This application is a continuation of U.S. application Ser. No. 16/442,310, filed Jun. 14, 2019, which is a continuation of U.S. application Ser. No. 16/039,147, filed Jul. 18, 2018, both of which are incorporated by reference.

TECHNICAL FIELD

The disclosure generally relates to the field of biological sample analysis, and in particular to a system for automatically counting the number of parasites in a sample.

BACKGROUND

Many parasites live within or on animals. One class of parasites lives within the digestive tracts of animals, such as sheep. These parasites can cause a wide range of problems, including disease and even death if left untreated. In agricultural settings, parasitic infections can have a serious impact on productivity of livestock. Furthermore, in some instances, such infections may have detrimental effects on humans who come into contact with the livestock.

To lessen these effects, there is on-going work to develop new medications and other treatments to reduce or eliminate parasitic infections. When a potential new treatment is developed, testing is performed to evaluate its efficacy. Existing testing methods involve extracting samples from animals' digestive tracts with various treatment and infection statuses (e.g., a group that is infected and untreated, a group that is infected and been treated, and an uninfected control group). A human then manually counts the number of parasites present in each sample to compare the groups and determine efficacy of the treatment. This is both unpleasant work for the human and prone to errors.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

As noted previously, counting parasites in a biological sample manually may be an unpleasant task and is prone to errors. The example embodiments disclosed may solve these and other problems by automating (or semi-automating) this task. A physical system controls the flow of a biological sample (e.g., taken from an animal's digestive tract) through an imaging cell. The physical system may be enclosed such that, once the sample has been added, human operators are not exposed to the sample. Portions of the sample are isolated in the imaging cell and a camera captures images of the isolated portions. Computer vision is used to count the number of parasites present in the isolated portions of the sample. Sampling techniques may then be used to estimate the total number of parasites in the sample.

Disclosed by way of example is a configuration that may include a parasite analysis system (and/or corresponding method) for counting the number of parasites in a biological sample. In one embodiment, the system includes a pressure vessel configured to store a biological sample, an imaging cell connected to the pressure vessel, and a waste depository connected to the imaging cell. An input valve controls whether biological sample can flow from the pressure vessel into the imaging cell and an output valve controls whether biological sample can flow from the imaging cell into the waste depository. The parasite analysis system also includes a camera that captures a chronological set of images of a portion of the biological sample in the imaging cell and an image analysis system that analyzes the chronological set of images to generate an estimate of a number of parasites in the portion of the biological sample. Estimates for multiple portions of the biological sample may be generated and sampling techniques used to estimate the number of parasites in the entire biological sample.

Example Automated Parasite Counting System

Figure 1:
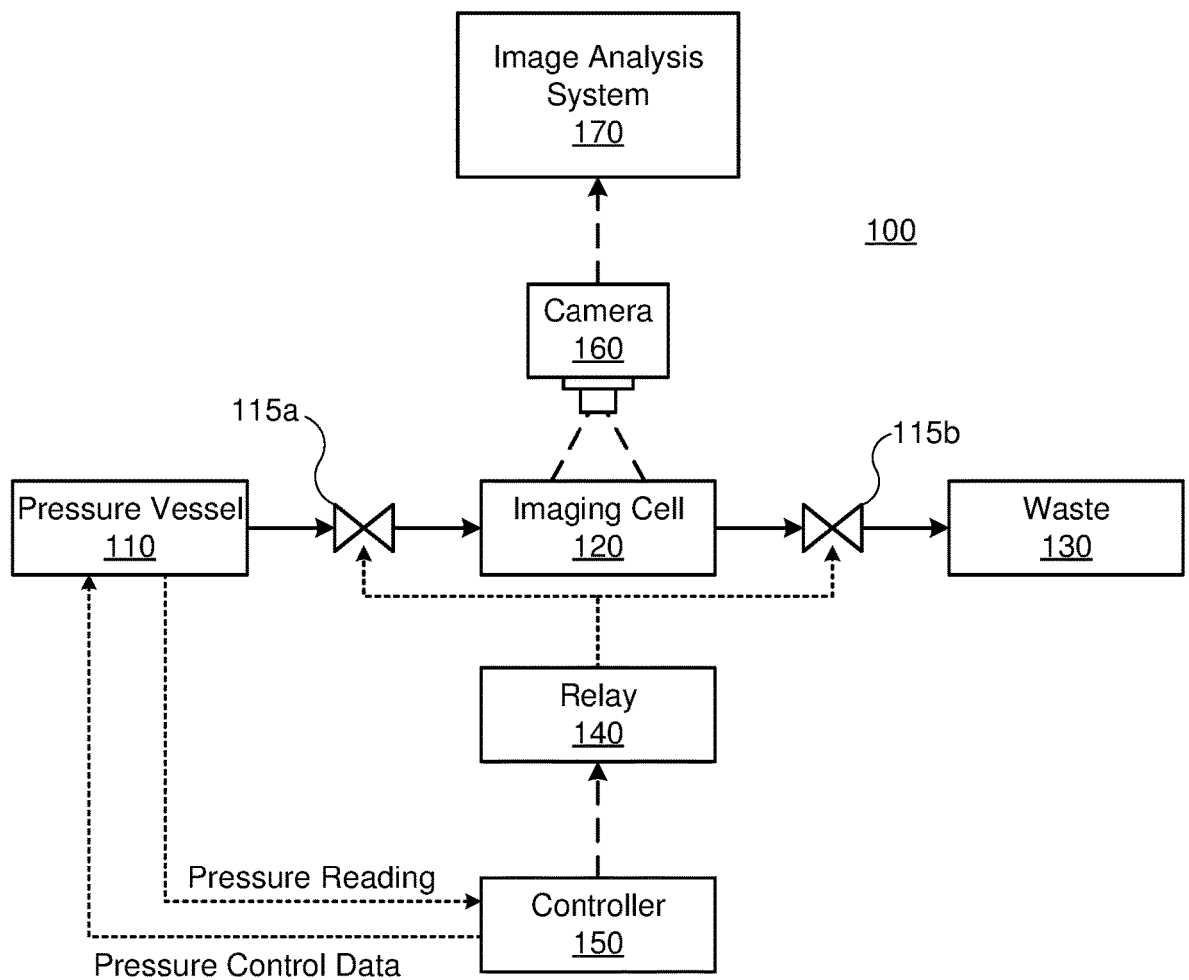
FIG. 1 illustrates an example automated parasite analysis system, according to one embodiment.

FIG. 1 illustrates an example embodiment of an automated parasite analysis system 100. In the embodiment shown in FIG. 1, the automated parasite analysis system 100 includes a pressure vessel 110, an imaging cell 120, a waste depository 130, a camera 160, and an image analysis system 170. Flow of a biological sample to and from the imaging cell 120 is controlled by an input valve 115a and an output valve 115b, which are controlled by a controller 150 using a relay 140. In other embodiments, the networked computing environment 100 may include different and/or additional elements. In addition, the functions may be distributed among the elements in a different manner than described. For example, although the controller 150 and image analysis system 170 are shown as separate entities, in one embodiment, the functionality of each is provided by a single computing device.

The pressure vessel 110 holds a biological sample for which a count of the number of parasites is desired. The pressure vessel 110 includes or is connected to a pump (e.g., an air pump) to maintain an internal pressure greater than the ambient pressure. The content of the pressure vessel 110 may be continuously or periodically mixed (e.g., using a magnetic stirrer) to prevent the sample from separating (e.g., with organic material sinking to the bottom of the vessel) making the portions that flow into the imaging cell 120 unrepresentative. For clarity and convenience, the automated parasite analysis system 100 is described in various places below with reference to an example embodiment where the biological sample is the extracted content of a sheep's stomach. However, one of skill in the art will recognize that the automated parasite analysis system 100 may be used with other biological samples.

In the embodiment shown in FIG. 1, the pressure vessel 110 is connected to an imaging cell 120, which is in turn connected to a waste depository 130. The imaging cell 120 may be a transparent cell aligned with a camera 160 for capturing images of a portion of the biological sample (e.g., some or all of the sample currently contained within the cell). The waste depository 130 may be a tank, vessel, or other mechanism for disposing of the biological sample. In one embodiment, the waste depository 130 is a sealed container. Thus, the automated parasite analysis system 100 may keep the biological sample enclosed during testing, preventing exposure of human operators from hazards and/or odors associated with the biological sample.

Flow of the biological sample to the waste depository 130 through the imaging cell 120 is controlled by an input valve 115a (between the pressure vessel 110 and the imaging cell) and an output valve 115b (between the imaging cell and the waste depository). When the valves 115 are open, the stomach content is pushed through the imaging cell 120 and into the waste depository 130 under the pressure of the pressurized vessel 110. After sufficient time has passed for the content of the imaging cell to be completely (or substantially) replaced (e.g., 100 milliseconds to 1 second), the valves 115 may be closed. The content of the imaging cell may be considered to be substantially replaced if a predefined percentage (e.g., 70%, 80%, 90%, 95%, etc.) by volume of the content has changed. In some cases, the valves 115 remain open until it is statistically likely that more than the volume of the imaging cell 120 has been replaced (e.g., 140%, 180%, 200%, etc. of the image cell volume) to ensure none of the sample is imaged twice In other embodiments, multiple imaging cells 120 are connected to the pressure vessel 110 in series and/or parallel. This can reduce the amount of time required to analyze the biological sample.

In one embodiment, the valves 115 are solenoid valves that are controlled by a relay 140. The solenoid valves 115 may be normally open valves (meaning they are open unless the relay 140 applies a current to the solenoids to close the valves) or normally closed valves (meaning they are closed unless the relay applies a current to open the valve). Whether the relay 140 applies a current to the valves 115 is determined by a controller 150. The controller 150 may be a micro-controller, desktop computer, or other such electronic device. In other embodiments, different types of valves 115 and/or control mechanisms may be used.

Under various circumstances, the pressure in the pressure vessel 110 may change. For example, when the valves 115 are open and the biological sample is flowing through the imaging cell, the pressure in the pressure vessel may drop. In one embodiment, the pressure vessel 110 includes one or more pressure sensors that periodically or continuously send pressure readings to the controller. The controller 150 provides pressure control data (e.g., instructions to a pump to pump air into the pressure vessel) to maintain the pressure within the pressure vessel 110. In other words, the pressure vessel sensors and controllers 150 operate as a feedback loop to maintain the pressure in the pressure vessel 110 at a desired level. Alternatively, the pressure vessel 110 may include a separate system (e.g., an integrated microcontroller) for maintaining the desired pressure.

The camera 160 captures images of a portion of the biological sample currently within the imaging cell 120. The camera 160 can capture images of the entire imaging cell 120 or a portion of the cell (e.g., a central imaging portion). The camera may include optical components to magnify the portion of biological sample being imaged or be connected to a microscope or other magnification device so that parasites may be resolved in the captured images. In one embodiment, after the valves 115 have been closed, the system 100 waits for a predetermined period (e.g., two to three seconds) for the portion of the biological sample within the imaging cell 120 to settle. The camera 160 then captures a chronologically ordered set of images (e.g., five to ten seconds of video) that is sent to the image analysis system 170 for further processing. The images may be streamed to the image analysis system 170 during capture or sent in bulk at specified times, such as on completion of capture of the set, on instruction by a user of the image analysis system 170, and/or on a periodic schedule (e.g., once a day).

Once the camera 160 has captured the images, the valves 115 may be reopened. The pressure from the pressure vessel 110 pushes the portion of the biological sample that was imaged into the waste depository 130 and replaces it in the imaging cell 120 with a new, yet to be imaged portion from the pressure vessel 110. The camera 160 may then capture images of the new portion and the process can be repeated until an end condition is met. In one embodiment, the end condition is that all (or substantially all) of the biological sample has been moved from the pressure vessel 110 to the waste depository 130. In other embodiment, the end condition is that a specified number of portions of the biological sample have been imaged by the camera 16. In other embodiments, other end conditions may be used.

The image analysis system 170 analyzes the images of a portion of the biological sample captured by the camera 160 to determine the number of parasites present in the imaged portion. In various embodiments, the image analysis system 170 identifies moving objects by analyzing differences between images in a chronologically ordered set of images and identifies regions that are candidates for including parasites. In the case where the biological sample is the extracted contents of a sheep's stomach, the parasites may be worms that have a known range of sizes. Thus, candidate regions can be specified based on an expected size range for worms. The image analysis system 170 applies a classifier to distinguish between candidate regions that that contain parasites and those that do not (e.g., those that contain grass or other partially digested food). The classifier may be heuristic, machine-learned, or use a combination of both approaches. Various example embodiments of the analysis performed by the image analysis system 170 are described in greater detail below, with reference to FIGS. 2 and 5.

In some embodiments, the biological sample is diluted with an appropriate solvent (e.g., water) either in the pressure vessel 110 or before it is added to the pressure vessel. Dilution of the biological sample may reduce the likelihood of the valves 115 becoming clogged. It may also reduce the likelihood that parasites are close enough together that they overlap or are otherwise in close enough proximity in the mages captured by the camera 160 that the individual parasites are difficult to identify. For example, if the parasite analysis system 100 uses candidate regions that are approximately the size of a parasite, the sample may be diluted such that the probability of two parasites being within the same region being sufficiently small that this scenario can be discounted without significantly impacting the accuracy of the results. On the other hand, dilution increases the volume of the sample that is imaged. Therefore, the amount of dilution used may be selected to balance the advantages of less clogging and less likelihood of an image region containing two (or more) parasites with the increased time required for imaging.

Some of the components of the parasite analysis system 100 may communicate via a network (not shown). For example, the camera 160 might transmit captured images to the image analysis system 170 over the network. The network can include any combination of local area and/or wide area networks, using both wired and/or wireless communication systems. In one embodiment, the network uses standard communications technologies and/or protocols. The network can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML), extensible markup language (XML). In particular, chronological sets of images captured by the camera 160 may be transferred in suitable formats, such as Matroska Multimedia Container (MKV), MPEG-4, or corresponding vector representations (e.g., NumPy or Comma-Separated Variable (CSV) files). In some embodiments, all or some of the communication links of the network 170 may be encrypted using any suitable technique or techniques.

Figure 2:
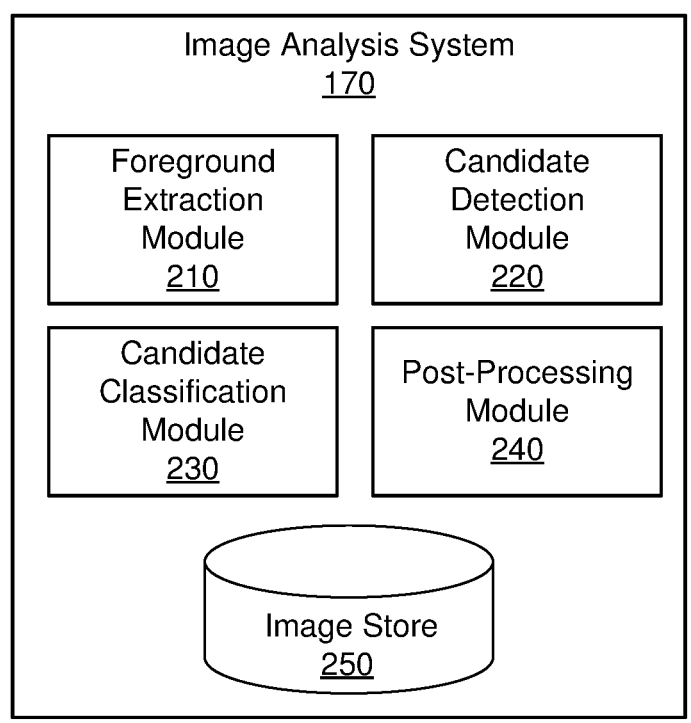
FIG. 2 illustrates an image analysis system configured for use in the automated parasite analysis system of FIG. 1, according to one embodiment.

FIG. 2 shows one embodiment of an image analysis system 170 that analyzes images of a sample to determine the number of parasites in the sample. In the embodiment shown in FIG. 2, the image analysis system 170 includes a foreground extraction module 210, a candidate detection module 220, a candidate classification module 230, a post-processing module 240, and an image store 250. In other embodiments, the image analysis system 170 may include different and/or additional elements. In addition, the functions may be distributed among the elements in a different manner than described.

The foreground extraction module 210 receives a set of chronologically ordered images from a camera 160 (e.g., video of the imaging cell 120) and identifies foreground pixels. The foreground pixels are those pixels of the images that change (or change more than a threshold amount) relative to substantially static background parts of the image. For example, an edge of the imaging cell 120 will be in the same location in every image (assuming the camera 160) has not removed and is thus a background pixel. In contrast, a parasitic worm swimming across the imaging cell 120 will appear at different positions in each image. In one embodiment, the foreground extraction module 210 uses robust principal component analysis (RPCA) to extract the foreground pixels from the images. The designation of a pixel as a foreground pixel may be binary (e.g., a label indicating a pixel is either foreground or background) or include a foreground pixel score (e.g., a probability that the pixel corresponds to a foreground feature). In other embodiments, other background subtraction and/or feature detection algorithms may be used (e.g., neural networks).

The candidate detection module 220 identifies patches of the images that are likely to include a parasite. The set of patches identified in an image may be non-overlapping or may be restricted to overlapping by no more than a threshold amount (e.g., 20%, etc.). In various embodiments, the approximate size of parasites is known. For example, where the biological sample is the extracted content of a sheep's stomach that is being tested for a particular parasitic worm, the typical size range of that worm is known. Based on the magnification level of the images and the distance between the camera 160 and the imaging cell 120, the candidate detection module 220 can determine an expected range of sizes for parasites in the images. Alternatively, this range of sizes can be pre-determined and provided as a parameter.

In one embodiment, the candidate detection module 220 defines a rectangular window that is large enough encompass the largest expected size of parasite (or any parasite within a given percentile of the expected size range, such as 99%). The window is placed at each possible patch of that size in an image and the candidate detection module 220 calculates a foreground pixel score for the patch. The foreground pixel score may be calculated by counting the number of foreground pixels in the window at that location. In other words, the number of pixels that correspond to something that is moving from one image to the next. The window with the highest score is found. If this score exceeds a threshold, the corresponding patch is flagged as a candidate patch for including a parasite. The process is repeated for window locations that do not overlap with candidate patches (or overlap by less than a threshold amount) until an end condition is met (e.g., no more candidate patches may be identified for which the foreground pixel score exceeds the threshold). Alternatively, overlap between candidate patches may be avoided or reduced by setting all of the pixels within a candidate patch to be background pixels (e.g., given a foreground feature score of zero). Other forms of non-maxima suppression may be used. Thus, for each image in the set, the candidate detection module 220 flags patches that are candidates for including a parasite.

In another embodiment, the contribution of a given pixel to the foreground pixel score is weighted based on the given pixel's position in the window. For example, the candidate detection module 220 can apply a two-dimensional function centered at the center of the window to calculate the weight for a pixel such that pixels near the center of the window contribute more than those around the edges. The standard deviation for the Gaussian function may be set to control the extent to which distance from the center of the window impacts weighting. Typically, a relatively large standard deviation is used so that pixels in the center of the window do not dominate the determination, but any standard deviation may be used. In other embodiments, other weighting functions and/or other techniques for identifying candidate patches may be used.

Regardless of the specific approach used to identify the candidate patches, in one embodiment, the candidate patches are filtered based on whether preceding and following images in the set also have candidate patches at similar locations. For example, based on an expected range of speeds for parasites and the time between images, the candidate detection module 220 may identify candidate patches in other images that may correspond to the same parasite as a candidate patch (assuming one is present). If the images preceding and/or following images do not have candidate patches that are likely to correspond to the candidate patch in the current image, the candidate detection module 220 may determine that it is an artifact and remove it as a candidate. Using this or a similar approach across multiple images, the candidate detection module 220 may track the movement of an object from image to image (e.g., speed and direction). This movement may be used to aid in determining whether the candidate patches correspond to parasites or some other object. Note that, although this functionality is described in the context of the candidate detection module 220, the same or similar functionality may additionally or alternatively be provided by the post-processing module 240.

The candidate classification module 230 applies a classifier to the candidate patches to determine whether they include a parasite. In various embodiments, the classifier is based on variance in histograms of gradients determined from the candidate patches. The candidate classification module 230 determines the gradient at each pixel in the candidate patch. The gradients have an orientation and a magnitude. The orientation may indicate the direction from the current pixel in which pixel intensity changes the most rapidly (e.g., in degrees) and the magnitude indicates the extent of that intensity change. The orientation may be signed (e.g., ranging from 0 to 360 degrees) or unsigned (e.g., ranging from 0 to 180 degrees).

The candidate classification module 230 defines a set of bins, each corresponding to a range of orientations. For example, if unsigned orientations are used, there might be nine bins that are each twenty degrees wide (e.g., 0 to 20 degrees, 20 to 40 degrees, 40 to 60 degrees, etc.). Various examples are given below based on this distribution of bins, but other distributions may be used. The bins need not be of equal size and any number of bins may be used.

The candidate classification module 230 calculates a histogram of gradients for the patch by determining the contribution of the gradient of each pixel to one or more bins. In one embodiment, each pixel gradient is assigned to the bin that encompasses its orientation and the magnitude of the pixel gradient is added to a cumulative total for that bin. For example, a gradient with magnitude sixteen at an orientation of fifteen degrees may add sixteen to the "0 to 20 degrees" bin. In another embodiment, the contribution of a pixel gradient is divided between the bins based on proximity of the pixel gradient orientation to the center of the bins. For example, in the previous case of the gradient of magnitude sixteen with an orientation of fifteen degrees, the gradient orientation is five degrees from the center of the "0 to 20 degrees" bin and fifteen degrees from the "20 to 40 degrees" bin. Thus, the gradient may add twelve to the "0 to 20 degrees" bin and four to the "20 to 40 degrees" bin. In other words, the contribution of the gradient to each bin is inversely proportional to the distance of the orientation from the center of each bin. In other embodiments, other ways of weighting the contribution of gradients to two or more bins may be used.

Regardless of the specific details of how the gradient of histograms is calculated for a candidate patch, the candidate classification module 230 also calculates a gradient of histograms for the same portion of a subset of the other images in the set of images (e.g., the image in which the candidate patch was identified and the nine images immediately following it in the set, a set of nine consecutive images centered around the image in which the candidate patch was identified, or the like). Large differences in the histograms for images that were captured close together in time (e.g., consecutive images) are indicative of a live parasitic worm being present in the patch. This is because such worms swim in a snake like manner, whereas dead worms, partially digested food, and other non-parasite objects will tend to drift in approximately straight lines. However, a relatively large object, such as a blade of grass, moving across the frame from image to image may still generate some gradient changes as the object covers and uncovers underlying background.

In one embodiment, the candidate classification module 230 calculates a difference metric between each pair of consecutive images in the set and classifies the patch as including parasite if the average of the difference metrics exceeds a threshold. In one example, the difference metric is calculated by finding the standard deviation of each histogram bin over time and summing the standard deviations. The threshold used may be optimized through cross validation as it may depend on other parameters, such as the size of the candidate patches used, the length of time for which data is collected, and the like. In another embodiment, the motion vector field is analyzed to distinguish between objects that exhibit snake-like motion (e.g., parasites) and objects that move largely in one direction (e.g., floating debris).

In another set of embodiments, the classifier is a machine-learned classifier, such as a neural network, a gradient boosted decision tree, a support vector machine, or the like. In these embodiments, a set of training data is collected and the training data is labelled by human operators as either including or not including a parasite. In one such embodiment, the human operators may identify the set of pixels that correspond to the worm (e.g., by tracing its outline on the image using a touchscreen). The training data may be, for example, a set of patches that either do or do not contain a parasite. The classifier is then trained (e.g., using backpropagation) to correctly sort the training data into those that are labelled as containing a parasite and those that are not. The training of the classifier may also be validated by applying it to a set of validation data that has also been human-labelled but which was not used for the training. Once trained (and validated, if validation is used), the classifier may then be applied in place of (or in conjunction with) a gradient of histograms approach to classify candidate patches as either including or not including a parasite.

Regardless of the specific approach used to classify the candidate patches, the end result is the post-processing module 240 produces a count of the number of parasites in each image based on the candidate patch classifications. In one embodiment, the count for the number of parasites in an image is the number of candidate patches classified as containing a parasite. In another embodiment, each classification includes a level of certainty (e.g. a probability that the classification is correct) and the count is determined by the levels of certainty. For example, the post-processing module 240 may sum the probability for each candidate patch or perform some other weighted combination based on the levels of certainty. The count for a given image may also be influenced by the location of candidate patches in other images in the set. For example, as noted previously, a candidate patch is more likely to genuinely include a parasite if there are parasites at similar locations in the preceding and following images. Thus, the contribution of a candidate patch to the count may be weighted based on proximity to candidate patches in other images.

The post-processing module 240 takes the parasite counts for the set of images and estimates the total number of parasites in the biological sample. In one embodiment, the total number of parasites is estimated in a two-stage process: (1) the number of parasites in each portion of the biological sample imaged is estimated; and (2) the total number of parasites in the biological sample is estimated based on the estimated parasite counts for the imaged portions.

The post-processing module 240 estimates the number of parasites in a particular portion of the biological sample based on the individual parasite counts for images in the set of images of that portion captured by the camera 160. In one embodiment, to estimate the number of parasites in the portion, the post-processing module 240 calculates the median of the individual parasite counts determined from the images in the set. This may be a reasonable measure of the number of parasites in that portion assuming the number of false positives and false negatives are approximately equal. In other embodiments, other methods for determining the number of parasites in a portion of the biological sample may be used, such as taking the maximum, mean, or mode of the individual counts. A total number of detected parasites may then be calculated by summing the estimates for each imaged portion.

As described previously, the automated parasite analysis system 100 captures sets of images of multiple portions of biological sample. The post processing module 240 may estimate the total parasite count for the biological sample by assuming the imaged portions are representative of the whole (e.g., that the imaged portions are a sufficient fraction of the whole to be a statistically valid sample). For example, the automated parasite counting system 100 may image approximately 10% of the total volume of the biological sample. In one embodiment, the post processing module 240 determines the total volume of the biological sample and the total volume of the imaged portions. The total volume of the biological sample may be determined by measuring it in the pressure vessel 110 before any imaging is performed. Alternatively, the total volume may be measured elsewhere, such as in the waste depository 130.

The total volume of the imaged portions may be determined by multiplying the volume of the imaging cell 120 by the number of portions imaged. The post processing module 240 may then estimate the total number of parasites in the biological sample by multiplying the total number of detected parasites by the ratio of the total volume of the biological sample and the total volume of the imaged portions. Additionally or alternatively, other statistical sampling methods may be used to estimate the total number of parasites from the number of parasites detected.

The image store 250 includes one or more computer-readable media configured to store the images captured by the camera 160. The image store 250 may also store metadata in association with the images, such as date and time of capture, the source of the biological sample, the type of the biological sample, the type of the parasite being counted, an identifier of a drug trial for which the biological sample is being analyzed, the parasite counts for the individual images determined by the candidate classification module 230, the parasite counts determined for the sets of images determined by the post-processing module, and the like. Although the image store 250 is shown as a single entity within the image analysis system 170, in some embodiments, it may be located remotely at one or more other computing devices (e.g., in a distributed database).

Example Machine Architecture

Figure 3:
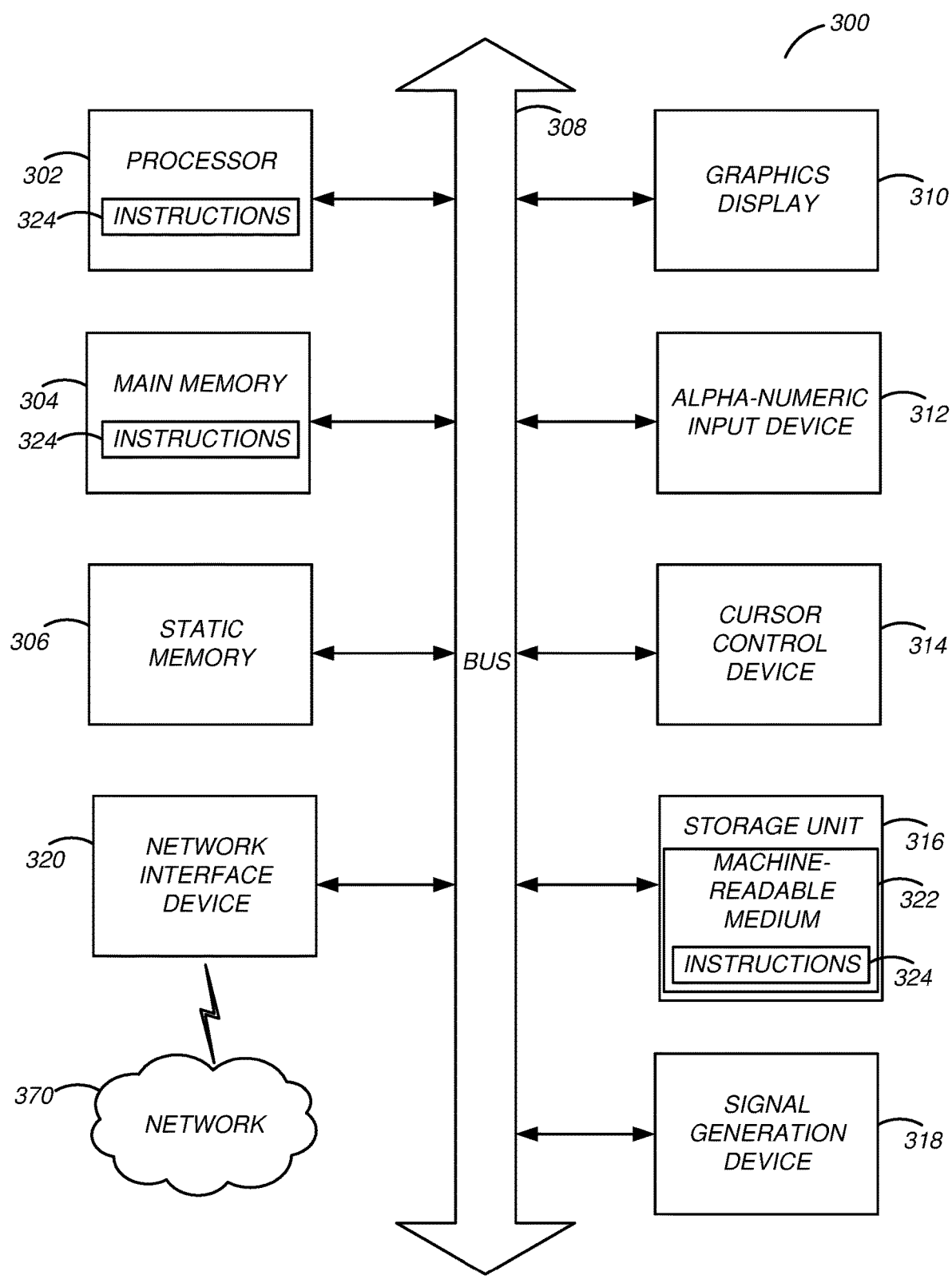
FIG. 3 is a block diagram illustrating components of an example machine able to read instructions from a machine-readable medium and execute them in a processor (or controller), according to one embodiment.

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300. The computer system 300 can be used to execute instructions 324 (e.g., program code or software) for causing the machine to perform any one or more of the methodologies (or processes) described herein, including those associated, and described, with the components (or modules) of a controller 150 and/or image analysis system 170. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes one or more processing units (generally one or more processors 302). The processor 302 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 302 may refer to a single processor or multiple processors. The computer system 300 also includes a main memory 304. The computer system may include a storage unit 316. The processor 302, memory 304, and the storage unit 316 communicate via a bus 308.

In addition, the computer system 300 can include a static memory 306, a display driver 310 (e.g., to drive a plasma display panel (PDP), a liquid crystal display (LCD), or a projector). The computer system 300 may also include alphanumeric input device 312 (e.g., a keyboard), a cursor control device 314 (e.g., a mouse, a trackball, a joystick, a motion sensor, or other pointing instrument), a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 may be transmitted or received over a network 370 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store the instructions 324. The term "machine-readable medium" shall also be taken to include any medium that is capable of storing instructions 324 for execution by the machine and that cause the machine to perform any one or more of the methodologies disclosed herein. The term "machine-readable medium" includes, but not be limited to, data repositories in the form of solid-state memories, optical media, and magnetic media.

Example Methods for Automatically Counting Parasites

Figure 4:
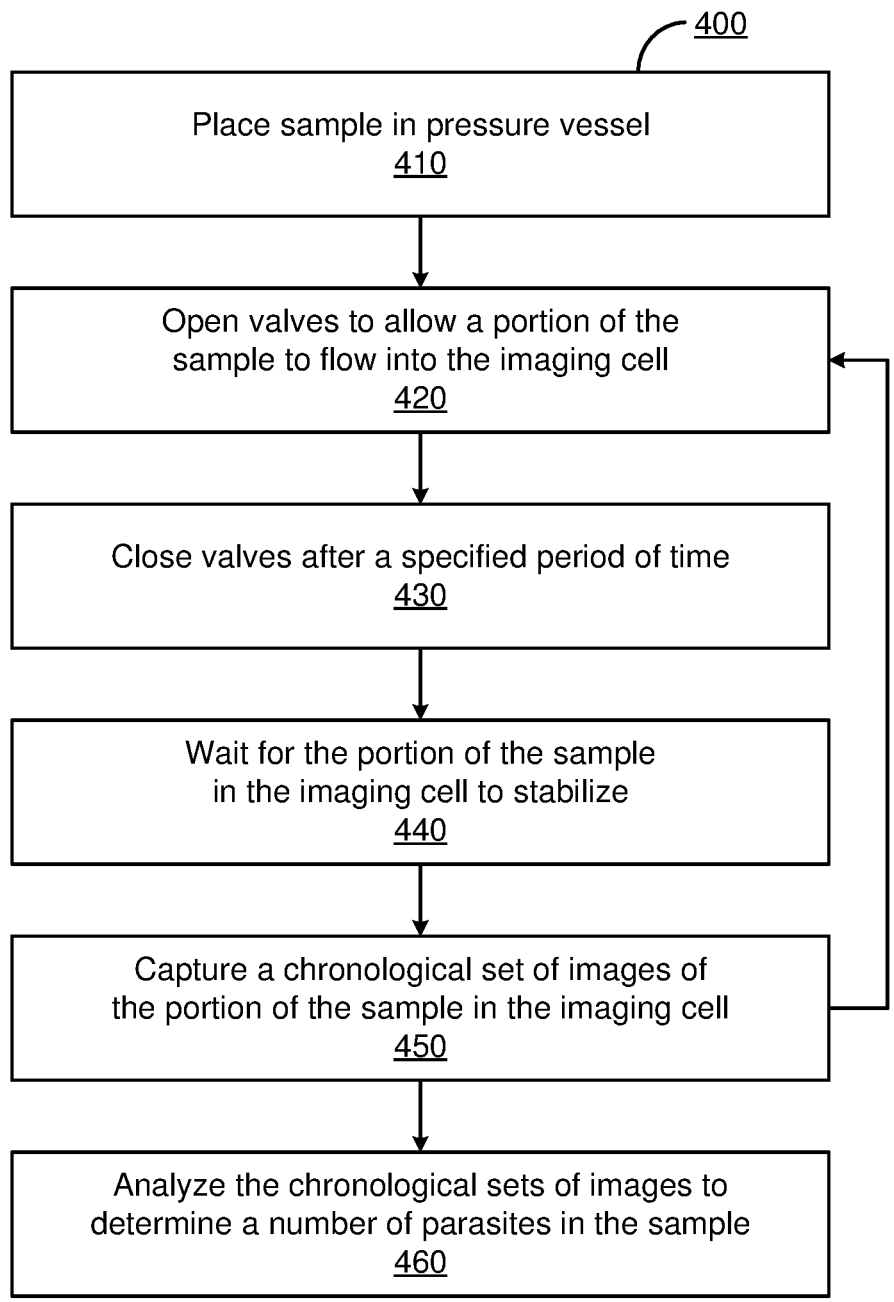
FIG. 4 is a flowchart illustrating an example method for automatically counting the number of parasites in a sample, according to one embodiment.

FIG. 4 illustrates one embodiment of an example method 400 for automatically counting the number of parasites in a sample. The steps of FIG. 4 are illustrated from the perspective of various components of the automated parasite analysis system 100 performing the method 400. However, some or all of the steps may be performed by other entities and/or components. In addition, some embodiments may perform the steps in parallel, perform the steps in different orders, or perform different steps. For example, although FIG. 4 shows image analysis being performed after all of the images have been captured, in some embodiments, one set of images may be analyzed while additional images are being captured.

In the embodiment shown in FIG. 4, the method 400 begins with a biological sample being placed 410 in a pressure vessel 110. This may be done where the biological sample is collected with the pressure vessel 110 transported and then connected to the rest of the automated parasite analysis system 100. For example, the biological sample might be collected at a farm and the transported to a laboratory for testing. Alternatively, the pressure vessel may be permanently or semi-permanently installed with the biological sample being placed 410 within it on-site.

The controller 150 opens 420 the valves 115 to enable a portion of the biological sample to flow into the imaging cell 120. If this is the first portion of the biological sample to be imaged, the imaging cell 120 may be initially empty or may contain existing fluid (e.g., a portion of a different biological sample, cleaning fluid, water, or the like). If this is not the first portion of the biological sample to be imaged, the imaging cell 120 may contain a previously imaged portion of the biological sample. In either case, the valves 115 remain open for any existing content to be pushed out of the imaging cell 120 into the waste depository 130 to be replaced by the incoming portion of the biological sample. In one embodiment, the valves 115 remain open for a period in the range from one hundred milliseconds to one second. The precise time may be selected to balance certainty that substantially all of the content of the imaging cell 120 has been replaced with minimizing the amount of the biological sample that passes through the waste depository 130 without being imaged. Once the valves 115 have been open for the specified time, the controller 150 closes 430 the valves, stopping the flow of biological sample.

The automated parasite analysis system 100 waits 440 for the portion of the biological sample in the imaging cell 120 to settle. As the portion has been forced into the imaging cell 120 under pressure, when the valves 115 are initially closed 430, there may be significant turbulence in the portion. The resulting motion of objects within the biological sample may make distinguishing between parasites and non-living entities difficult. In one embodiment, the waiting period is between two and three seconds, but other periods may be used.

Once the waiting period has passed, the camera 160 captures 450 a chronological set of images (e.g., five to ten seconds of video) of the portion of the sample in the imaging cell 120. The images may be equally spaced in time (e.g., video captured at 24 or 30 frames per second) or unequally spaced with the time of capture for each image being stored as metadata in association with the image. For example, the camera 160 might automatically adjust a shutter speed to normalize an average brightness of the captured images leading to changes in the time between images if the background illumination level changes significantly. Regardless of the specific timing of the capture of the images, the camera 160 sends the set of images to an image analysis system 170 to be stored (e.g., in an image store 250).

Once the set of images has been captured 450, the automated parasite analysis system 100 determines whether there is more of the biological sample to image. If so, the automated parasite analysis system 100 repeats the steps of opening 420 the valves 115, closing 430 the valves, waiting 440 for the new portion of the biological sample in the imaging cell 120 to settle, and capturing 450 a chronological set of images of the new portion of the biological sample.

The image analysis system 170 analyzes 460 the chronological sets of images to estimate the total number of parasites present in the biological sample. As described previously, various approaches may be used to estimate the number of parasites present in the imaged portions of the biological sample, including a histogram of gradients approach and machine learning. Various sampling techniques can then be used to estimate the total number of parasites present in the entire biological sample based on the estimated counts for the imaged portions. Example embodiments of methods for analyzing a set of images are described in greater detail below, with reference to FIG. 5.

In one embodiment, the automated parasite analysis system 100 analyzes biological samples from different stages of a trial of an anti-parasite treatment. For example, biological samples might be collected from groups of sheep at different stages in the treatment process, such as immediately before treatment begins, the day after treatment begins, ten days after treatment begins, the day treatment ends, a month after treatment ends, or the like, as well as from one or more control groups (e.g., a group that is infected and untreated and/or a group that is not infected). Thus, the efficacy over time of the treatment can be determined by comparing the parasite counts determined for each biological sample.

Figure 5:
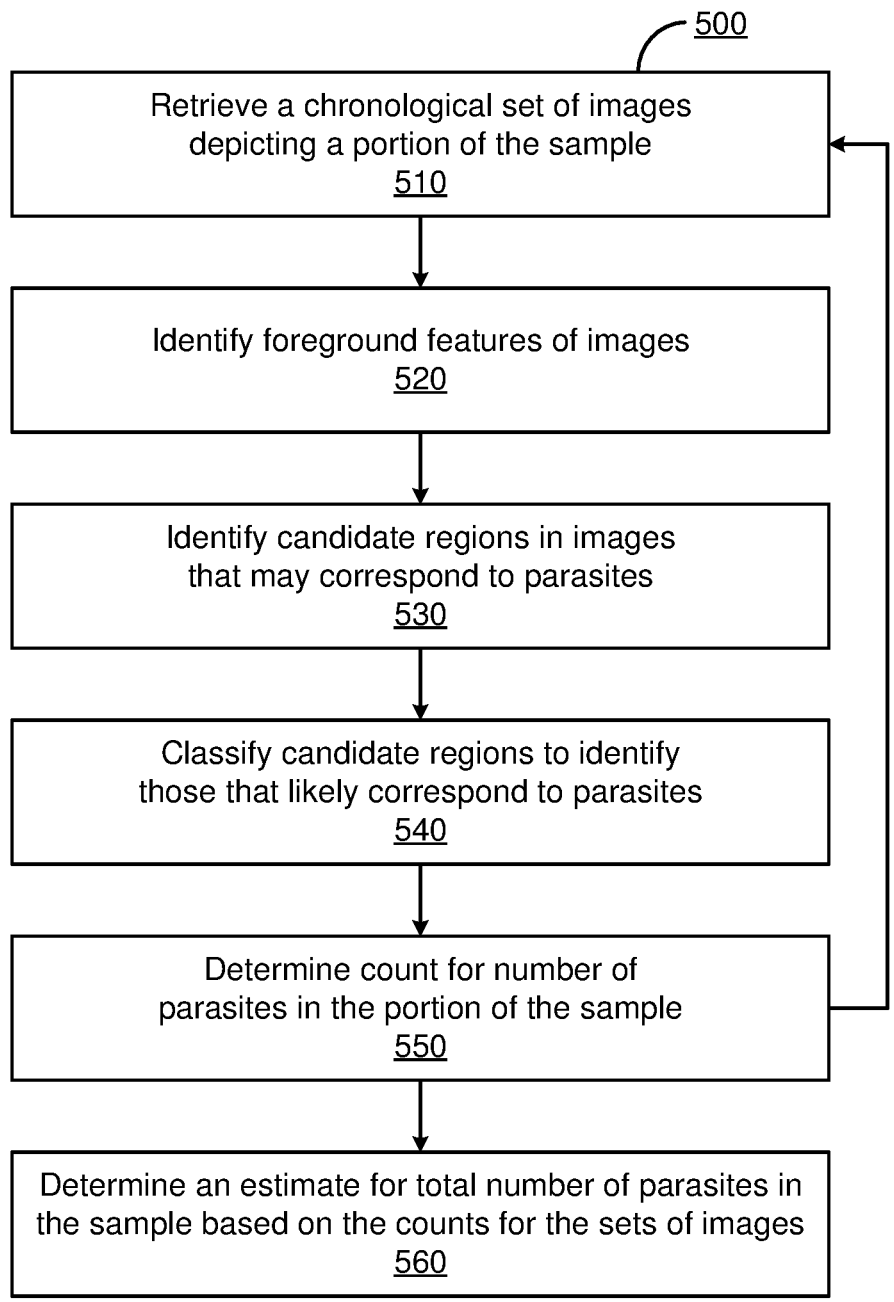
FIG. 5 is a flowchart illustrating an example method for analyzing images of a sample to determine the number of parasites in the sample, according to one embodiment.

FIG. 5 illustrates one embodiment of an example method 500 for images of a sample to determine the number of parasites in the sample (e.g., as step 460 in the method 400 illustrated by FIG. 4). The steps of FIG. 5 are illustrated from the perspective of the image analysis system 170 performing the method 500. However, some or all of the steps may be performed by other entities and/or components. In addition, some embodiments may perform the steps in parallel, perform the steps in different orders, or perform different steps.

In the embodiment shown in FIG. 5, the method 500 begins with image analysis system 170 retrieving 510 a chronological set of images depicting a portion of a biological sample (e.g., a set captured by the camera 160). The images may be retrieved directly from the camera 160 or from a data store (e.g., image store 250). The images in the set depict the portion of the biological sample at different times. The timing and/or order of the images may be indicated by metadata that is retrieved along with the images.

The foreground extraction module 210 identifies 520 foreground pixels in the images. Based on the foreground extraction module results, the candidate detection module 220 identifies 530 candidate regions (patches) in the images that may correspond to parasites. As described previously, in one embodiment, RPCA is applied to the set of images to identify 520 pixels that significantly change across the set of images as foreground pixels and a sliding window is used to identify 530 those patches in an image for which a foreground pixel score for the patch exceeds a threshold. As described previously, a non-maxima suppression technique may be applied to prevent a single parasite resulting in multiple candidate patches being identified with high confidence levels (e.g., by changing foreground pixels within identified patches to background pixels, not allowing candidate patches to overlap by more than a threshold amount, etc.). The foreground pixel score may be a count of the number of foreground pixels in the patch or a weighted sum of foreground pixels (e.g., where the contribution of a given foreground pixel is subject to weighting determined by a two-dimensional Gaussian function centered at the center of the patch). The candidate classification module 230 classifies 540 the candidate regions to identify those that likely correspond to parasites. In one embodiment, the histogram of gradients approach described above, with reference to FIG. 2, is used to classify 540 the candidate patches. In other embodiments, other classification techniques may be used, such as applying a machine-learning model. Regardless of the specific classification method used, the result is that the candidate classification module 230 identifies a set of patches that are likely to correspond to parasites. In one embodiment, the candidate classification module 230 outputs a set of classified patches (e.g., locations and confidence levels that each patch depicts a parasite) for each image in the set. An image may have zero candidate patches.

The post-processing module 240 determines 550 a count for the number of parasites in the portion based on the parasite counts for the individual images in the set. In one embodiment, post-processing module 240 calculates the median of the parasite counts for the individual images. Other forms of averaging may also be used, such as the mean (with or without rounding), mode, etc.

If there are one or more sets of images for the current biological sample that are still to be analyzed, the image analysis system 170 repeats the steps of retrieving 510 a set of images of a portion of a biological sample, identifying 520 foreground pixels in the images, identifying 530 candidate regions of the images, classifying 540 the candidate regions, and determining 550 a count for the number parasites in the portion of the biological sample.

Based on the determined 550 parasite counts for the sets of images of portions of the biological sample, the post-processing module 240 determines 560 an estimate for the total number of parasites in the biological sample. As described previously, any appropriate sampling technique may be used to convert the number of parasites detected in the portions of the sample that were imaged into an estimate of the number of parasites in the whole sample.

Alternate Parasite Analysis System Configuration

Figure 6:
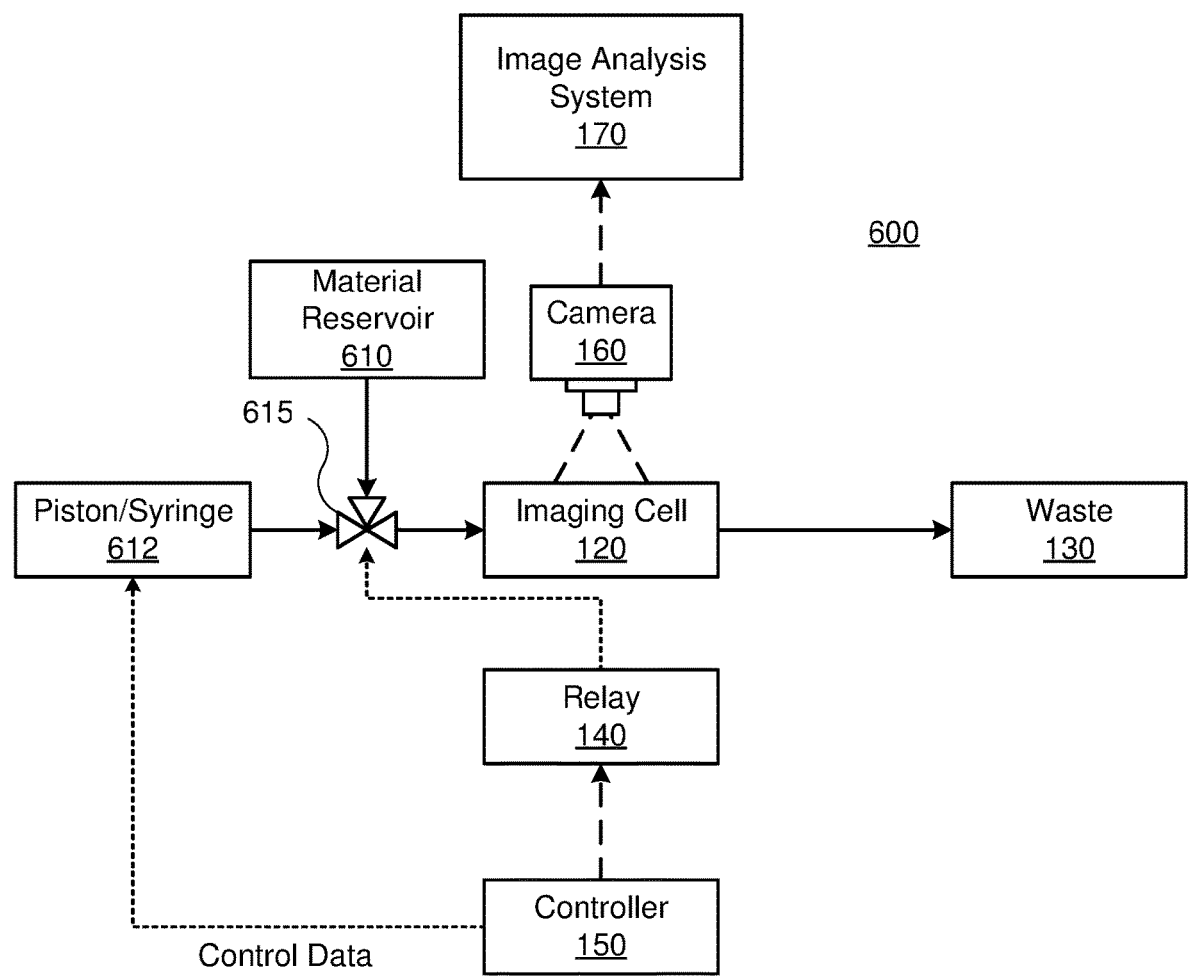
FIG. 6 illustrates an alternate configuration of an example parasite analysis system, according to one embodiment.

FIG. 6 illustrates an example embodiment of an alternate configuration for a parasite analysis system 600. In contrast to the embodiment shown in FIG. 1, the parasite analysis system 600 stores unanalyzed sample material in a material reservoir 610. The material reservoir 610 can be any container or vessel suitable for holding the biological sample to be analyzed. Unlike the pressure vessel 110 in FIG. 1, the material reservoir 610 need not be pressurized (although it may be).

A three-way valve 615 controls flow of the biological sample from the material reservoir 610 to a piston/syringe 612 and from the piston/syringe 612 to the imaging cell 120.

At the beginning of a cycle, the controller 150 sets the three-way valve to open the connection between the material reservoir 610 and the piston/syringe 612 (e.g., using the relay 140). The controller 150 sends a signal to the piston/syringe 612 causing it to suck a portion of the biological sample from the material reservoir 610 into the piston/syringe 612. The controller 150 then sets the three-way valve 615 to open the connection between the piston/syringe 612 and the imaging cell 120 and sends a signal to the piston/syringe 612 causing it to push the portion of the biological sample into the imaging cell 120 for imaging by the camera 160. The incoming portion of the biological sample may force any existing content of the imaging cell 120 into the waste depository 130. This cycle may be repeated until the desired amount of the biological sample has been imaged.

Note that in the embodiment shown in FIG. 6, the automated parasite analysis system 600 does not include a valve between the imaging cell 120 and the waste depository 130. However, in some embodiments, such a valve may be included (e.g., an output valve 115*b*). The embodiment shown in FIG. 6 may be advantageous in certain cases for various reasons. For example, the use of less valves may result in the system 600 being less prone to clogging and thus require less maintenance. As another example, by replacing the pressure vessel 110 with a material reservoir 610, the system 600 may be cheaper and/or more convenient to operate.

Additional Considerations

The disclosed approaches enable the number of parasites in a biological sample to be determined automatically (or semi-automatically). These approaches may have various advantages, including eliminating human bias from the counting process, saving operator time, and protecting operators from the hazards and/or odors resulting from exposure to the biological sample. Furthermore, where the images captured by the automated parasite analysis system 100 are stored, the parasite counts may be verified by further analysis, which may not be possible in systems where the parasites are counted by a human operator examining the biological sample.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion)

as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 302, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition X or Y is satisfied by any one of the following: X is true (or present) and Y is false (or not present), X is false (or not present) and Y is true (or present), and both X and Y are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for proving that a target system 110 was configured as intended, according to an approved recipe 131, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A parasite analysis system comprising:
   a material reservoir configured to store a biological sample;
   an imaging cell controllably connected to the material reservoir and configured to receive a portion of the biological sample from the material reservoir;

a camera configured to capture a chronological set of images of the portion of the biological sample in the imaging cell; and an image analysis system configured to:
- identify candidate patches in at least a subset of the chronological set of images that are candidates for depicting a parasite;
- filter the candidate patches based on a comparison of locations of the candidates patches to locations of candidate patches in images immediately before and/or after the candidate patches;
- generate, based on the filtered candidate patches, parasite counts for the subset of the chronological set of images, each parasite count indicating a number of parasites detected in a corresponding image of the chronological set of images; and
- generate, based on the parasite counts, an estimate of a number of parasites in the portion of the biological sample, wherein the estimate of the number of parasites in the portion of the biological sample is based on the locations of the candidate patches that depict a parasite.

2. The parasite analysis system of claim 1, wherein the image analysis system being configured to identify candidate patches comprises the image analysis system being configured to:
- identify patches in at least some images of the chronological set of images as the candidate patches based on foreground pixels included in the patches, wherein each candidate patch is a portion of one of the images having a location within the corresponding image; and
- apply a classifier to the candidate patches to identify candidate patches that depict a parasite.

3. The parasite analysis system of claim 2, wherein the image analysis system being configured to identify candidate patches further comprises the image analysis system being configured to:
- identify foreground pixels in at least some of images of the chronological set of images, the foreground pixels being pixels whose values change significantly between images in the set, wherein the candidate patches are identified based on foreground pixels included in the patches.

4. The parasite analysis system of claim 2, wherein, to identify patches in at least some images of the chronological set of images as candidate patches, the image analysis system is configured to:
- place a window of predetermined size at a plurality of positions in an image, the predetermined size based on an expected size of a parasite;
- calculate, for each position of the window, a foreground pixel score based on a number of foreground pixels within the window;
- identify a portion of the image within the window when the window is at a given position as a candidate patch responsive to the foreground pixel score for the given position exceeding a threshold; and
- set at least some pixels within the window when the window is at the given position as background pixels responsive to the foreground pixel score for the given position exceeding the threshold.

5. The parasite analysis system of claim 2, wherein, to identify candidate patches that depict a parasite, the classifier is configured to:
- calculate a histogram of gradients for a candidate patch in a first image of the chronological set of images;
- identify a comparison portion of a second image in the chronological set of images, a location of the comparison portion in the second image corresponding to a location of the candidate patch in the first image;
- calculate a histogram of gradients for the comparison portion; and
- determine whether the candidate patch depicts a parasite based on a comparison between the histogram of gradients for the candidate patch and the histogram of gradients for the comparison portion.

6. The parasite analysis system of claim 1, wherein, to generate the estimate of the number of parasites in the portion of the biological sample, the image analysis system is configured to:
- determine a parasite count for each of a plurality of images of the chronological set of images; and
- generate the estimate of the number of parasites by calculating a median of the parasite counts.

7. The parasite analysis system of claim 1, further configured to:
- generate an estimate of a number of parasites in each of a plurality of additional portions of the biological sample; and
- generate an estimate for a total number of parasites in the biological sample based on the estimates of the number of parasites in the portion and the plurality of additional portions.

8. The parasite analysis system of claim 1, further comprising:
- a piston or syringe; and
- a three-way valve connecting the material reservoir, imaging cell, and piston or syringe, wherein, in a first configuration, the portion of the biological sample can flow from the material reservoir to the piston or syringe and, in a second configuration, the portion of the biological sample can flow from the piston or syringe to the imaging cell.

9. The parasite analysis system of claim 8, further comprising a controller configured to:
- generate a first control signal that causes the three-way valve to be in the first configuration;
- generate a second control signal that causes the piston or syringe to suck the portion of the biological sample into the piston or syringe;
- generate a third control signal that causes the three-way valve to be in the second configuration; and
- generate a fourth control signal that causes the piston or syringe to push the portion of the biological sample into the imaging cell.

10. The parasite analysis system of claim 1, wherein the material reservoir is pressurized and the imaging cell is controllably connected to the material reservoir by an input valve, the system further comprising:
- a controller configured to open the input valve to enable the portion of the biological sample to flow from the material reservoir into the imaging cell.

11. The parasite analysis system of claim 10, further comprising an output valve configured to control flow of the portion of the biological sample from the imaging cell into a waste depository, wherein the controller opens and closes the input valve and the output valve simultaneously.

12. The parasite analysis system of claim 10, wherein the controller is configured to open the input valve, wait for a predetermined period of time in a range from one hundred milliseconds to one second while the portion of the biological sample flows into the imaging cell, and close the input valve after the predetermined period of time.

13. The parasite analysis system of claim 12, wherein the camera is further configured to capture the chronological set of images in a period beginning in a range from two seconds to three seconds after the input valve is closed.

14. A method for analyzing a sample, the method comprising:
receiving a chronological set of images of a portion of the sample;
identifying candidate patches in at least a subset of the chronological set of images that are candidates for depicting a parasite;
filtering the candidate patches based on a comparison of locations of the candidates patches to locations of candidate patches in images immediately before and/or after the candidate patches;
generating, based on the filtered candidate patches, parasite counts for the subset of the chronological set of images, each parasite count indicating a number of parasites detected in a corresponding image of the chronological set of images; and
generating, based on the parasite counts, an estimate of a number of parasites in the portion of the sample, wherein the estimate of the number of parasites in the portion of the sample is based on the locations of the candidate patches that depict a parasite.

15. The method of claim 14, further comprising:
identifying foreground pixels in at least some of images of the chronological set of images, the foreground pixels being pixels whose values change significantly between images in the set, wherein the candidate patches are identified based on foreground pixels included in the patches.

16. The method of claim 14, wherein identifying the candidate patches comprises:
placing a window of predetermined size at a plurality of positions in an image, the predetermined size based on an expected size of a parasite;
calculating, for each position of the window, a foreground pixel score based on a number of foreground pixels within the window;
identifying a portion of the image within the window when the window is at a given position as a candidate patch responsive to the foreground pixel score for the given position exceeding a threshold; and
setting at least some pixels within the window when the window is at the given position as background pixels responsive to the foreground pixel score for the given position exceeding the threshold.

17. The method of claim 14, wherein filtering the candidate patches comprises:
calculating a histogram of gradients for a candidate patch in a first image of the chronological set of images;
identifying a comparison portion of a second image in the chronological set of images, a location of the comparison portion in the second image corresponding to a location of the candidate patch in the first image;
calculating a histogram of gradients for the comparison portion; and
determining whether the candidate patch depicts a parasite based on a comparison between the histogram of gradients for the candidate patch and the histogram of gradients for the comparison portion.

18. The method of claim 14, wherein generating the estimate of the number of parasites in the portion of the sample comprises:
determining a parasite count for each of a plurality of images of the chronological set of images; and
generating the estimate of the number of parasites by calculating a median of the parasite counts.

19. The method of claim 14, further comprising:
generating an estimate of a number of parasites in each of a plurality of additional portions of the sample; and
generating an estimate for a total number of parasites in the sample based on the estimates of the number of parasites in the portion and the plurality of additional portions.

20. A non-transitory, computer-readable medium comprising computer program code that, when executed by a computing system, causes the computing system to perform operations including:
receiving a chronological set of images of a portion of a sample;
identifying candidate patches in at least a subset of the chronological set of images that are candidates for depicting a parasite;
filtering the candidate patches based on a comparison of locations of the candidates patches to locations of candidate patches in images immediately before and/or after the candidate patches;
generating, based on the filtered candidate patches, parasite counts for the subset of the chronological set of images, each parasite count indicating a number of parasites detected in a corresponding image of the chronological set of images; and
generating, based on the parasite counts, an estimate of a number of parasites in the portion of the sample, wherein the estimate of the number of parasites in the portion of the sample is based on the locations of the candidate patches that depict a parasite.

* * * * *